(12) United States Patent
Smit et al.

(10) Patent No.: US 7,997,297 B2
(45) Date of Patent: Aug. 16, 2011

(54) SYSTEM AND METHOD FOR PERFORMING A CHEMICAL EXPERIMENT

(75) Inventors: Martin Smit, Bloemendaal (NL); Gerardus Johannes Maria Gruter, Heemstede (NL)

(73) Assignee: Avantium International B.V., Amsterdam (NL)

( * ) Notice: Subject to any disclaimer, the term of this patent is extended or adjusted under 35 U.S.C. 154(b) by 520 days.

(21) Appl. No.: 11/910,493

(22) PCT Filed: Apr. 4, 2005

(86) PCT No.: PCT/NL2005/000247
§ 371 (c)(1),
(2), (4) Date: Dec. 6, 2007

(87) PCT Pub. No.: WO2006/107187
PCT Pub. Date: Oct. 12, 2006

(65) Prior Publication Data
US 2008/0159927 A1    Jul. 3, 2008

(51) Int. Cl.
*B01J 19/00* (2006.01)
*F16K 7/04* (2006.01)
(52) U.S. Cl. ........ 137/409; 422/130; 137/414; 137/493; 137/494; 137/510; 251/5; 251/61; 251/61.1
(58) Field of Classification Search .................. 422/130; 137/409, 414, 493, 494, 510; 251/5, 61, 251/61.1
See application file for complete search history.

(56) References Cited

U.S. PATENT DOCUMENTS

| | | | | | |
|---|---|---|---|---|---|
| 3,955,594 | A | * | 5/1976 | Snow | 137/493 |
| 4,467,999 | A | * | 8/1984 | Ritter | 251/61.1 |
| 4,494,345 | A | * | 1/1985 | Peterson | 137/414 |
| 4,790,344 | A | * | 12/1988 | Chauvier et al. | 137/112 |
| 5,535,983 | A | * | 7/1996 | Hohermuth | 251/5 |
| 6,039,078 | A | * | 3/2000 | Tamari | 138/30 |
| 6,102,361 | A | | 8/2000 | Riikonen | |
| 6,619,311 | B2 | * | 9/2003 | O'Connor et al. | 137/109 |
| 2001/0019705 | A1 | | 9/2001 | Reudiger et al. | |
| 2002/0045265 | A1 | * | 4/2002 | Bergh et al. | 436/37 |
| 2004/0109792 | A1 | | 6/2004 | Karlsson et al. | |
| 2006/0182667 | A1 | * | 8/2006 | Zech et al. | 422/130 |

FOREIGN PATENT DOCUMENTS

| | | |
|---|---|---|
| GB | 967261 | 8/1964 |
| WO | 0051720 | 9/2000 |
| WO | 0166245 | 9/2001 |
| WO | 2005/063372 A2 | 7/2005 |
| WO | 2005063372 | 9/2005 |

OTHER PUBLICATIONS

Chinese Patent Application No. CN2315376Y.

* cited by examiner

*Primary Examiner* — Walter D Griffin
*Assistant Examiner* — Huy-Tram Nguyen
(74) *Attorney, Agent, or Firm* — Hoffmann & Baron, LLP

(57) ABSTRACT

The invention relates to a system for performing parallel chemical experiments. The system comprises an array of parallel flow through reactors each comprising a reaction chamber, a reactor inlet and a reactor outlet connected to the reactor chamber. Downstream of each reactor a corresponding active pressure regulating arrangement is provided for actively regulating the reactor pressure. The pressure regulating arrangement comprises a passage for reactor effluent with an inlet connected to the reactor outlet and an outlet for discharging reactor effluent at a reduced pressure with respect to the reactor pressure.

11 Claims, 4 Drawing Sheets

SYSTEM AND METHOD FOR PERFORMING A CHEMICAL EXPERIMENT

CROSS-REFERENCE TO RELATED APPLICATIONS

This application is the National Stage of International Application No. PCT/NL2005/0000247, filed Apr. 4, 2005, the contents of which is incorporated by reference herein.

FIELD OF THE INVENTION

The present invention relates to a system for performing parallel chemical experiments, said system comprising an array of parallel flow-through reactors each comprising a reaction chamber, a reactor inlet and a reactor outlet connected to the reactor chamber.

SUMMARY OF THE INVENTION

Object of the invention is to provide an improved system and a method for performing chemical experiments.

According to a first aspect of the invention this object is achieved by a system for performing parallel chemical experiments. The system comprises an array of parallel flow through reactors each comprising a reaction chamber, a reactor inlet and a reactor outlet connected to the reactor chamber. Downstream of each reactor an individual active pressure regulating arrangement is provided for actively regulating the reactor pressure. The pressure regulating arrangement comprises an actively tunable passage for reactor effluent with an inlet connected to the reactor outlet and an outlet for discharging reactor effluent at a reduced pressure with respect to the reactor pressure.

According to this aspect the system comprises an array of parallel flow through reactors each comprising a reaction chamber, a reactor inlet and a reactor outlet connected to the reactor chamber. Downstream of each reactor an individual active pressure regulating arrangement is provided for actively regulating the reactor pressure. The pressure regulating arrangement comprises an actively tunable passage for reactor effluent with an inlet connected to the reactor outlet and an outlet for discharging reactor effluent at a reduced pressure with respect to the reactor pressure.

In a preferred embodiment, the active pressure regulating arrangement comprises an actively tunable passage for reactor effluent of each reactor, wherein the actively tunable passage has a movable member to cause variations of the effective cross-section of the passage.

Preferably the movable member is in contact with a common pressure chamber which is filled with a control gas, such that the movable member is moved towards the closed position if the reactor pressure is lower than the control gas pressure and is moved towards the open position if the reactor pressure exceeds the control gas pressure, and wherein the system further comprises a pressure controller to control the pressure of the control gas in the pressure chamber. The reactors of the array have in this embodiment a pressure regulating arrangement whereby the system is suitable for performing reactions in parallel reactors under the same pressure, e.g. 50 bar, such that the same pressure conditions in the reactors are maintained.

In a further preferred embodiment the movable member comprises a flexible wall member defining the actively tunable passage for reactor effluent, which wall member separates the actively tunable passage from a pressure chamber, the wall member being in contact with a control gas in said pressure chamber and being deformable by a pressure difference between the control gas within the pressure chamber and the pressure of the reactor effluent within the passage, and wherein the active pressure regulating arrangement further comprises a pressure controller to control the pressure of the control gas in the pressure chamber. The system according to this preferred embodiment thus provides a very simple so called backpressure regulating arrangement. With this regulating arrangement the pressure of the control gas in the pressure chamber can be brought to a certain value corresponding to a preset value by the pressure controller. If this pressure is higher than the reactor effluent pressure upstream of a tunable passage of the array, the deformable wall of said particular passage will be deformed such that the passage is throttled. As a consequence the pressure upstream of said tunable passage will rise until an equilibrium with the pressure of the control gas in the pressure chamber is reached. This pressure regulation is very robust and because of the simple concept the response time of the pressure controller is fast which makes it suitable for accurate pressure regulation in a system with a large range of fluid conditions, e.g. with two phase or three phase flow.

In a specifically preferred embodiment, the common pressure regulating arrangement has a common pressure chamber which is delimited by the respective flexible wall members and which pressure chamber is connected to the pressure con-roller. This has the advantage that no separate pressure controller is needed for every individual reactor outlet, but that only one pressure controller is needed for controlling the pressure in multiple reactors. This makes it a simple and inexpensive solution, in particular when a large number e.g. when at least 8, or possibly 16, 32 or more reactors are operated in parallel.

With the backpressure regulating arrangement according to the invention it is possible to keep the pressure of the effluent flow on a preset level even if the effluent flows have a multiple phase, e.g. a fluid and a gaseous phase.

The system can be used in practice with rather small reactor volumes, in particular for performing "high-throughput" small scale chemical experiments. In the experiments, such as rapid catalyst screening, the effluent stream from an array of parallel flow-through reactors can be analyzed with an analyzing device. The analysis can be performed online. The analyzing device can also have a sample collection device.

With the backpressure regulating arrangement according to the invention it is possible to keep the pressure of the effluent flows of the different reactors on a preset value even if the effluent flows have a multiple phase, e.g. a fluid and a gaseous phase.

The pressure in the reactors can in practice be up to 300 bar. Sample collection at such high pressure is impractical and can be dangerous. The pressure regulating arrangement according to the invention allows that the discharge of reactor effluent downstream of the valve does not have to take place at such high pressure, but can take place at much lower pressure, preferably at atmospheric pressure.

Another aspect of the invention relates to a method for performing chemical experiments, wherein an array of parallel flow through reactors is used, one or more flows of reactant (s) being fed from one or more common feed lines to each of the reactors. The flow from each feed line is divided over the reactors by providing between each reactor and the feed line a flow restrictor, said flow restrictor producing a pressure drop ($\Delta P_1$) between the feed line and the reactor. The pressure in the reactors is actively regulated by at least one backpressure regulator that is provided downstream of the reactors. The backpressure regulator has a passage for reactor effluent connected to the reactors, said passage having a discharge outlet for discharging reactor effluent. The backpressure regulator produces a pressure drop ($\Delta P_2$) between each reactor and the discharge outlet which is greater than the pressure drop ($\Delta P_1$) between the feed line and the reactor. In this method which is in practice used for reactions performed at a pressure above the atmospheric pressure, the reactor pressure is regulated by means of at least one backpressure regulator. In the method two pressure reduction steps are taking place. The first pressure reduction is caused by a flow restrictor upstream of the reactor which reduces feed pressure to the reactor inlet pressure. The second pressure reduction step is caused by the backpressure regulator that is downstream of the reactor. The flow restrictor upstream of the reactors preferably causes the distribution of equal flows to each of the reactors. They can be passive or active restrictors. In the method the restrictor upstream and the backpressure controller downstream of the reactor are chosen and eventually controlled such that the second pressure reduction step is greater than the first pressure reduction step. In general this allows that reactions can be performed at high pressures.

In a preferred embodiment of this method a system as described above is used with which the pressure in the reactor is controlled by controlling the pressure of the valve pressure chamber by means of the pressure controller.

A further aspect of the invention relates to a method for performing a chemical reaction, wherein a system for performing parallel chemical experiments is used, said system comprising an array of parallel flow through reactors each comprising a reaction chamber, a reactor inlet and a reactor outlet connected to the reactor chamber, wherein downstream of each reactor an individual active pressure regulating arrangement is provided for actively regulating the reactor pressure, the pressure regulating arrangement comprising an actively tunable passage for reactor effluent with an inlet connected to the reactor outlet and an outlet for discharging reactor effluent at a reduced pressure with respect to the reactor pressure. In this method a system as described above is used with which the pressure in the reactor is controlled by controlling the pressure of the valve pressure chamber by means of the pressure controller.

The invention will hereinafter be described in more detail with reference to the drawing.

DETAILED DESCRIPTION

Figure 1:
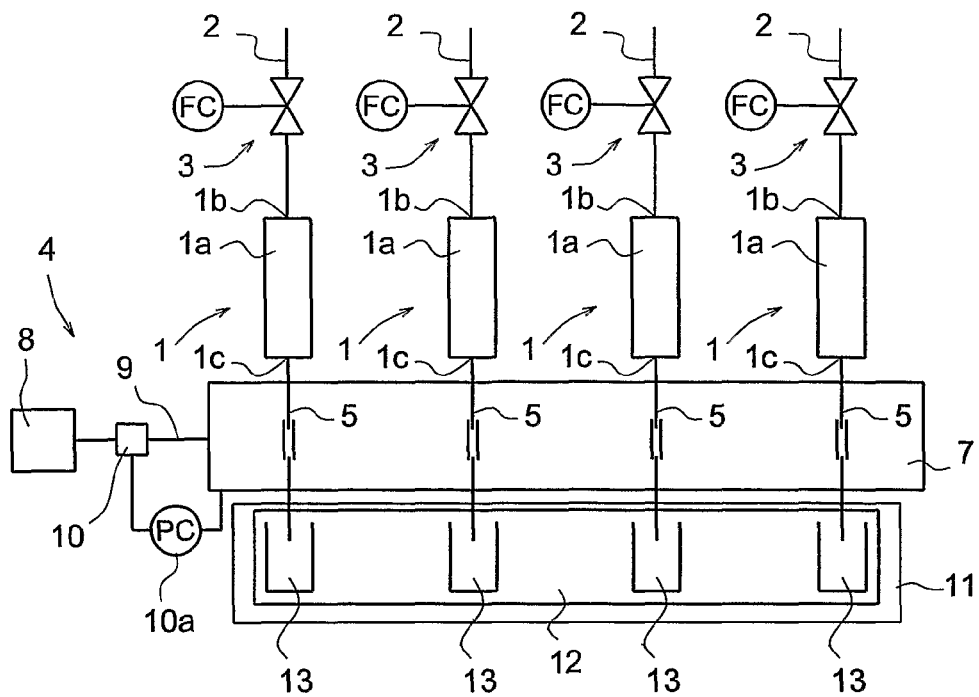
FIG. 1 shows a schematic diagram of a preferred embodiment of a system provided with a pressure regulating arrangement according to the invention and provided with an off-line sample analysis arrangement.

FIG. 1 shows a system for performing parallel chemical experiments, such as small-scale "high-throughput" experiments. The system comprises a plurality of flow-through reactors 1, which are arranged in parallel, e.g. the system includes at least 8, but possibly 16, 32 or more reactors. Each flow-through reactor 1 has a reaction chamber 1a, at least one reactor inlet 1b and a reactor outlet 1c. The reactor inlet 1b is connected to the feed conduit 2, which is provided with flow control means 3. Through the feed conduit 2 and the flow control means 3 a reactant, e.g. a fluid, a gas or a fluid-gas mixture can be fed to the reactor chamber 1a. With the flow control means 3 which are present in this embodiment of a system according to the invention, the flow into the reactor 1 can be actively controlled. In other words this means that the restriction of the flow can be regulated. In this embodiment for each reactor only one inlet 1b and one feed conduit 2 is shown. However, the skilled man will understand that the reactor can have more separate inlets for feeding different reactants. The flow through the reactor can be continuous or discontinuous.

Preferably experiments are performed simultaneously.

Figure 2:
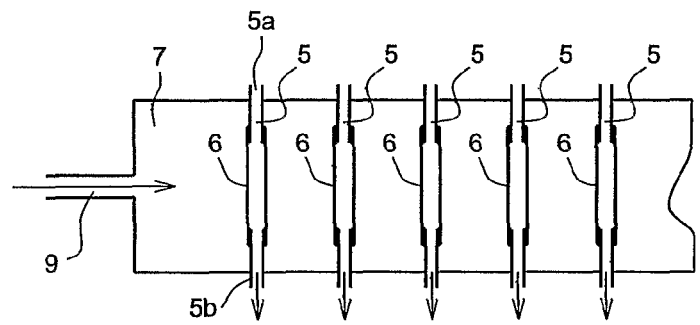
FIG. 2 shows a schematic detail of a part of the pressure regulating arrangement of the system of FIG. 1 with tunable passages in an open state.

Downstream of the reactor 1 the outlet 1c is connected to a pressure regulating arrangement 4. In FIG. 2 is shown a part of the pressure regulating arrangement 4 which comprises a passage 5 for reactor effluent with an inlet 5a connected to the reactor outlet 1c and an outlet 5b for discharging reactor effluent. In the embodiment shown in FIGS. 2 and 3 the passage 5 has an elastic deformable wall member in the form of a deformable tube 6, preferably made from an elastomer material.

The arrangement 4 further comprises a pressure chamber 7 in which the passage 5 with the deformable tube 6 is located. The pressure chamber 7 is connected to a high pressure gas source 8 via a gas feed line 9 through which a control gas, e.g. pressurized air, can be fed from the source 8 to the pressure chamber 7. In the gas feed line 9 a control valve 10 (see FIG. 1) is provided which can be opened and closed accurately to regulate the gas feed to the pressure chamber 7. The pressure chamber 7 can be pressurized by filling it with the control gas. The pressurizing process is controlled with a pressure controller 10a which has a pressure sensor (not shown) to measure the pressure in the pressure chamber 7. The pressure controller 10a is also connected to the control valve 10.

The passage 5 is an actively tunable passage for reactor effluent which functions as a valve. The deformable tube 6 is deformable by a pressure difference between the valve control gas within the pressure chamber 7 and the pressure of the reactor effluent within the passage 5. The inward or outward movement of the tube 6 due to said pressure difference causes variations of the effective cross-section of the passage 5.

Since in the embodiment of FIG. 1 all passages 5 of the parallel reactors are arranged in a common pressure chamber 7, the pressure in all the reactors 1 can be controlled with only one pressure controller 10a and one control valve 10. The simple structure of the pressure regulating arrangement results in a fast response, which leads to accurate regulation of the reactor pressure even with large fluctuations in the upstream flow. Within the scope of the invention it is also possible to have a system in which a common pressure chamber 7 for one set of reactors 1 performing under a certain common pressure and another common pressure chamber 7 for another set of reactors 1 performing under another or the same pressure.

The outlet 5b of the actively tunable passage 5 is connected to an analyzer device 11, which in the shown embodiment (see FIG. 1) comprises a sample collection device 12 with a plurality of sample collection containers 13. Whereas the pressure in the reactor can be very high (up to 300 bar), the samples are collected at a much lower pressure, preferably at atmospheric pressure (1 bar), due to the throttling action of the pressure regulating arrangement 4. The difference between the feed pressure of the reactant and the reactor pressure is preferably less than the difference between the reactor pressure and the discharge pressure at which the samples are collected. Instead of a sample collection device 12, analyzer device 11 could also comprise an on-line analyzing device as is shown in FIG. 6 and will be described hereinafter.

Figure 3:
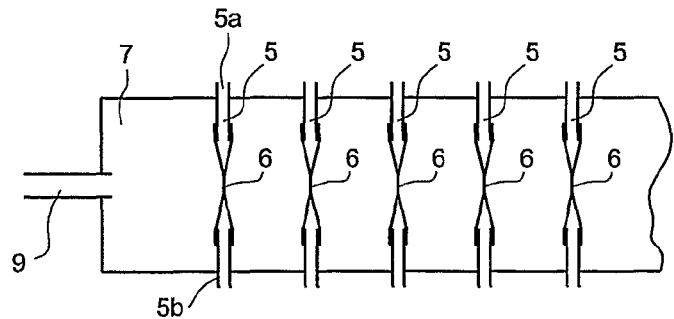
FIG. 3 shows a schematic detail of the part of the pressure regulating arrangement of FIG. 2 with the tunable passages in a closed state.
Figure 4A:
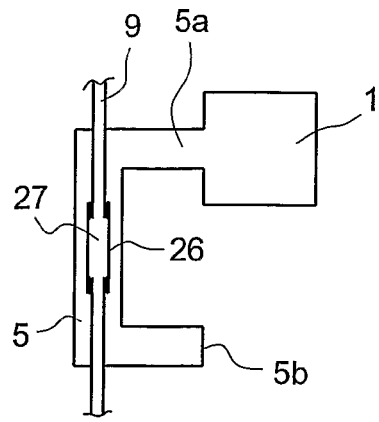
FIGS. 4a and 4b show a schematic view of a part of an alternative embodiment of the pressure regulating arrangement.
Figure 4B:
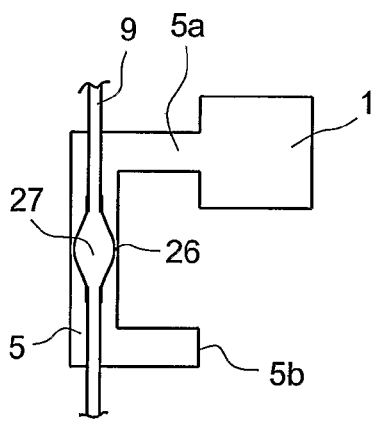

Another embodiment of an actively tunable passage with the same working principle as the embodiment of FIGS. 1-3 is shown in FIGS. 4a and 4b. In this embodiment a central gas line 9 extends coaxially through the passage 5 for reactor effluent. The control gas line 9 has a tubular flexible wall member 26, which is arranged within the passage 5. The control gas line 9 defines a pressure chamber 27. Control gas is fed to the pressure chamber 27, whereby the pressure in the chamber 27 is increased. The flexible wall member 26 is expanded and pressed against the wall of passage 5 (see FIG. 4b). Passage 5 is thus sealed by the flexible wall member 26 until the pressure in the reactor 1 approaches the pressure in the chamber 27 which will result in contraction of chamber 27 and passage of reaction gas between chamber 27 and the wall of passage 5.

Figure 5:
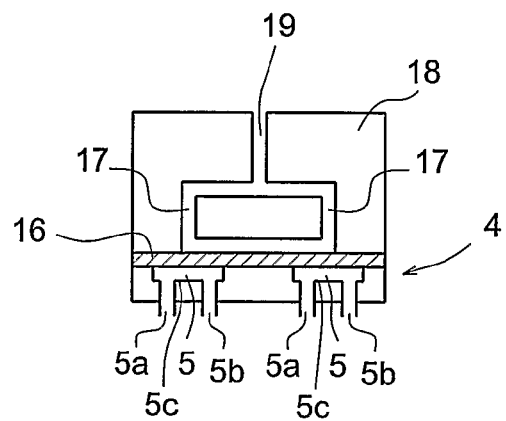
FIG. 5 shows a schematic view of a part of another alternative embodiment of the pressure regulating arrangement.

Yet another embodiment of an actively tunable passage with the same working principle as the embodiment of FIGS. 1-3 is shown in FIG. 5. The pressure regulating arrangement 4 according to this alternative embodiment comprises a passage 5 for reactor fluid with an inlet 5a connected to the reactor outlet and an outlet 5b for discharging reactor fluid. The passage 5 has a deformable wall member in the form of a deformable membrane 16. The membrane 16 is preferably of an elastomeric material. On the opposite side of the membrane 16 is arranged a manifold 18 with a main pressure conduit 19 which divides into pressure conduits 17, which each lead to a position opposite a passage 5, such that when pressure is applied on the membrane 16 through the pressure conduits 17, the membrane is deformed and moved against an opposite wall portion 5c of the passage such that the passage 5 is closed until the pressure upstream from the inlet 5a becomes substantially equal to the pressure in the conduits 17.

Figure 6:
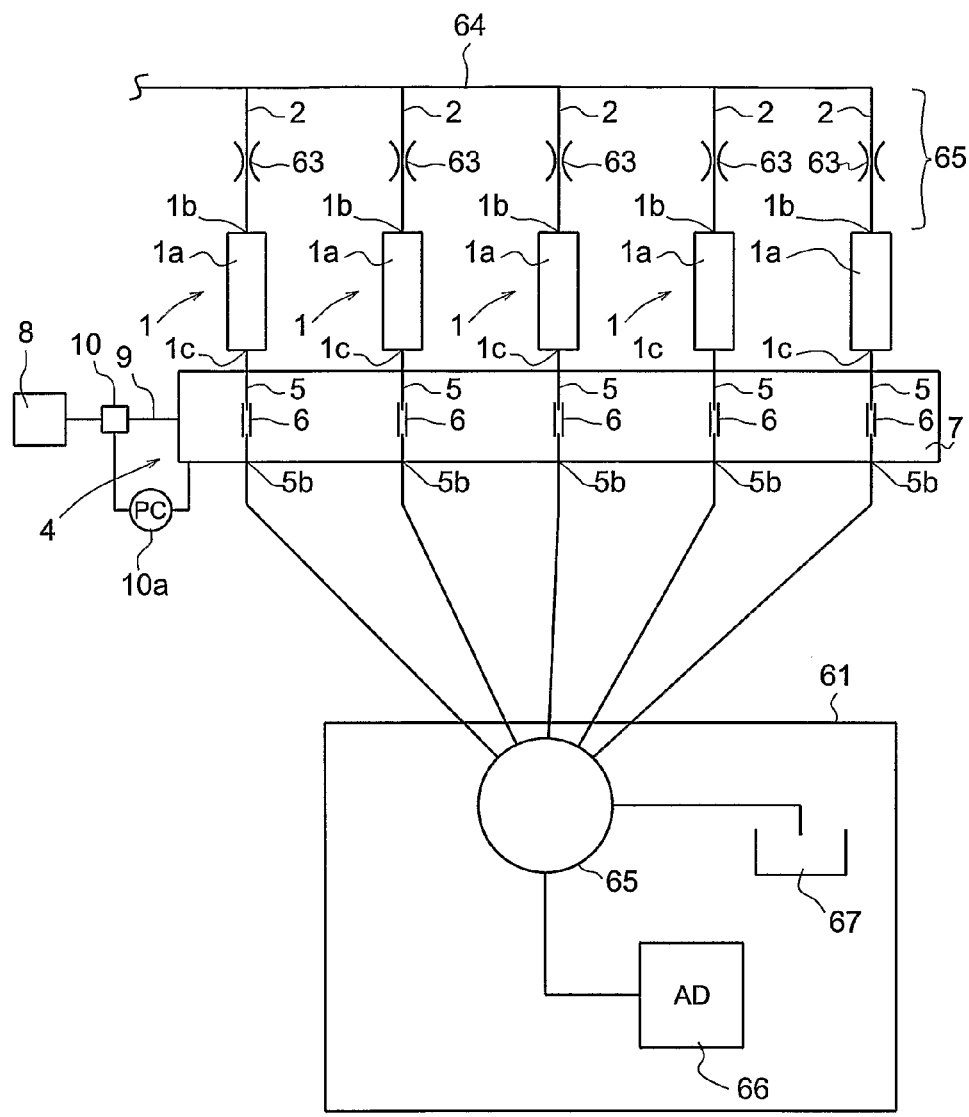
FIG. 6 shows a schematic diagram of a system provided with a pressure regulating arrangement according to the invention and an on-line sample analyzing arrangement.

In FIG. 6 a somewhat different system for performing parallel chemical experiments is shown. The system comprises a plurality of flow-through reactors 1, which are arranged in parallel. Each flow-through reactor 1 has a reaction chamber 1a, at least one reactor inlet 1b and a reactor outlet 1c. The reactor inlet 1b is connected to the feed conduit 2, which is provided with a restriction 63. Without wishing to be bound to this example the restriction e.g. comprises a capillary or a pinhole. Through the feed conduit 2 and the restriction 63 a reactant, e.g. a fluid, a gas or a fluid-gas mixture can be fed to the reactor chamber 1a from a common feed line 64 for all reactors. The shown arrangement with a common feed line 64 and parallel feed conduits 2 with restrictions 63 constitutes a flow splitter 65 which feeds an equal flow to each reactor 1. In this embodiment of FIG. 6 for each reactor only one inlet 1b and one feed conduit 2 is shown. However, the skilled man will understand that the reactor 1 can have more separate inlets for feeding different reactants. The flow through the reactor 1 can be continuous or discontinuous.

The pressure regulating arrangement 4 in FIG. 6 is equal to the one shown in FIGS. 1-3 and for its description reference is made to the corresponding description hereabove.

Each outlet 5b of the system of FIG. 6 is connected to a common analyzer device 61, which in the shown embodiment comprises a selector valve 65 which can selectively put one of the outlets 5b in fluid communication with an analyzing device (AD) 66, e.g. a gas chromatograph or a mass spectrometer device. The selector valve can also put the other reactors in fluid communication with a waste collector 67. With this analyzer device a sample of the effluent of one of the reactors 1 can be analyzed by the device 66, while the effluent from the remaining reactors 1 is directed to the waste collector 67. This results in a method wherein sequential analysis of the effluent samples is possible while the chemical reactions in the reactors 1 are performed in parallel. Depending on the analysis time and on the number of reactors, also more than one common analyzer device 61 can be employed. Instead of an on-line analyzing device as is shown in FIG. 6 also an off-line analyzer device 11 with a sample collection device 12 as is shown in FIG. 1 could be used.

Figure 7:
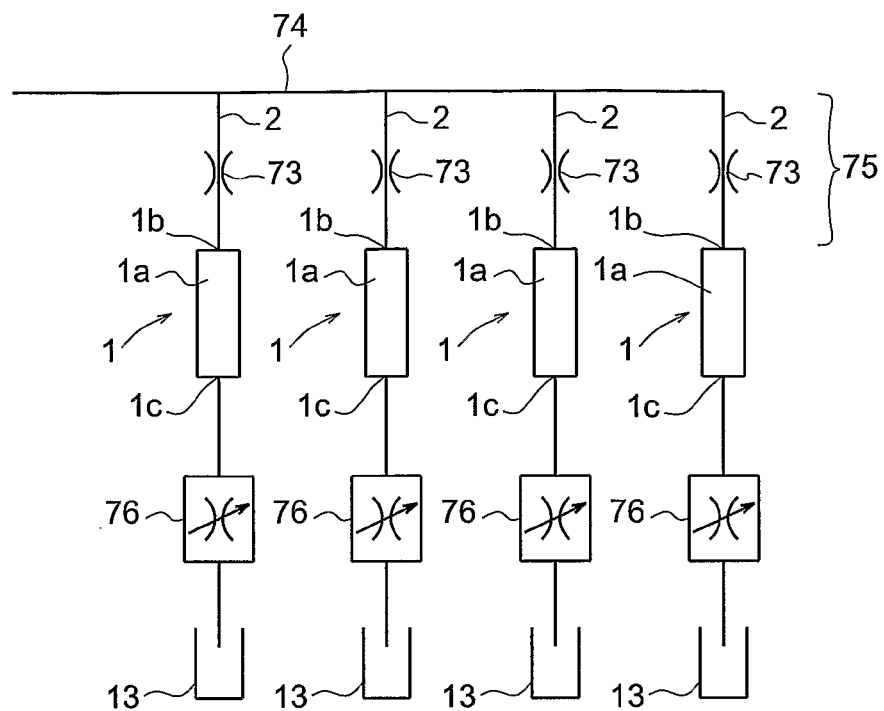
FIG. 7 shows a schematic diagram of another embodiment of a system according to the invention.

FIG. 7 shows a system for performing parallel chemical experiments. The system comprises a plurality of flow-through reactors 1, which are arranged in parallel. Each flow-through reactor 1 has a reaction chamber 1a, at least one reactor inlet 1b and a reactor outlet 1c. The reactor inlet 1b is connected to the feed conduit 2, which is provided with a flow restrictor 73. Through the feed conduit 2 and the restrictor 73 a reactant, e.g. a fluid, a gas or a gas-fluid mixture can be fed to the reactor chamber 1a from a common feed line 74 for all reactors 1. The shown arrangement with a common feed line 74 and parallel feed conduits 2 with restrictions 73 constitutes a flow splitter 75 which feeds an equal flow to each reactor 1. The flow restrictor 73 can comprise a capillary.

Through the feed conduit 2 and the flow restrictor 73 a reactant, e.g. a fluid or a gas can be fed to the reactor chamber 1a. In this embodiment only one inlet 1b and one feed conduit 2 per reactor is shown. However, the skilled man will understand that the reactor 1 can have more separate inlets for feeding different reactants. The flow through the reactor 1 can be continuous or discontinuous.

Downstream of each reactor 1 an accompanying controllable flow restriction 76 is provided which is connected with the reactor outlet 1c. In a possible embodiment each flow restriction 76 is controllable individually, which results in a system where each reactor has an individual backpressure controller. However, in a preferred embodiment the flow restrictions 76 are commonly controllable, most preferably in the way that is described hereabove with reference to FIGS. 1-6. In any way the flow restrictors 76 function as backpressure controllers. From the outlet of each backpressure controller reactor effluent is for example discharged in a sample collection container 13 which can be analyzed in an off-line analyzing device. Alternatively, the outlet of each backpressure controller is connected to a common analyzer device 61 as is shown in FIG. 6, which in the shown embodiment comprises a selector valve 65 which can selectively put one of the backpressure controller outlets in fluid communication with an analyzing device, e.g. a gas chromatograph or a mass spectrometer device 66.

Figure 8:
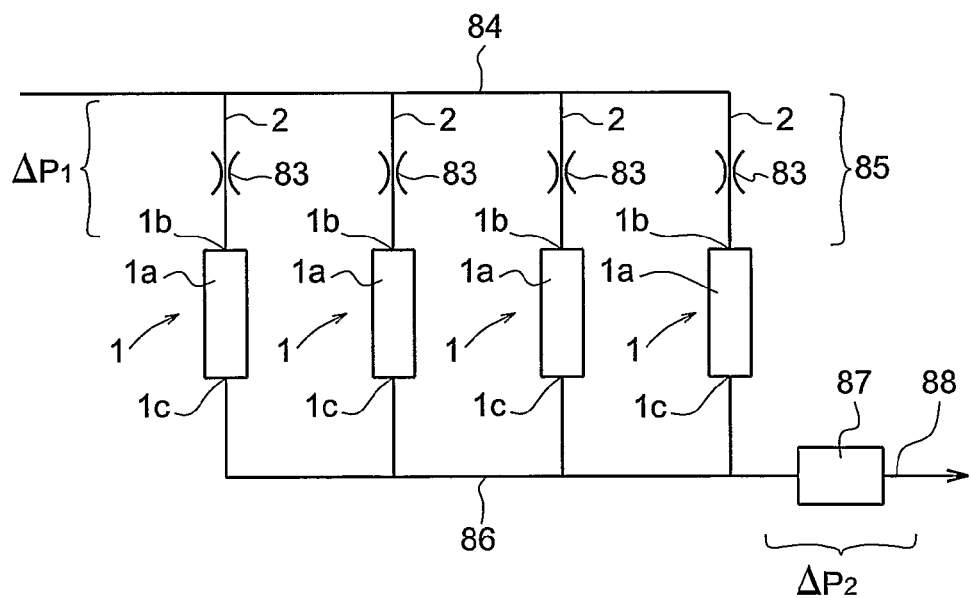
FIG. 8 shows a schematic diagram illustrating a possible system for performing the method according to the invention.

In FIG. 8 another system for performing parallel chemical experiments is shown. The system comprises a plurality of flow-through reactors 1, which are arranged in parallel. Each flow-through reactor 1 has a reaction chamber 1a, at least one reactor inlet 1b and a reactor outlet 1c. The reactor inlet 1b is connected to the feed conduit 2, which is provided with a flow restrictor 83, e.g. a capillary. Through the feed conduit 2 and the restrictor 83 a reactant, e.g. a fluid or a gas can be fed to the reactor chamber 1a from a common feed line 84 for all reactors 1. The shown arrangement with a common feed line 84 and parallel feed conduits 2 with restrictions 83 constitutes a flow splitter 85 which feeds an equal flow to each reactor 1.

The reactor outlet 1c of each reactor 1 is connected to a common discharge line 86. In the common discharge line 86 a single backpressure controller 87 is provided with a discharge outlet 88 for discharging reactor effluent coming from all the reactors 1. This system is used in a method for performing chemical reactions, preferably at a high pressure. Typically in this method the pressure difference over the restrictions 83 is lower than, the pressure difference over the backpressure regulator 87. This system can also be provided with an analyzing device (not shown) downstream of the backpressure controller.

What is claimed is:

1. A system for performing parallel chemical experiments, said system comprising an array of parallel flow through reactors each comprising a reaction chamber, a reactor inlet and a reactor outlet connected to the reaction chamber, wherein downstream of each reactor an individual active pressure regulating arrangement is provided for actively regulating the reactor pressure, the pressure regulating arrangement comprising an actively tunable passage for reactor effluent with an inlet connected to the reactor outlet and an outlet for discharging reactor effluent at a reduced pressure with respect to the reactor pressure;

wherein the active pressure regulating arrangement comprises an actively tunable passage arranged at the passage for reactor effluent of each reactor, wherein the actively tunable passage has a movable member to cause variations of the effective cross-section of the passage, wherein the movable member is in contact with a common pressure chamber which is filled with a control gas, such that the movable member is moved towards the closed position if the reactor pressure is lower than the control gas pressure and is moved towards the open position if the reactor pressure exceeds the control gas pressure, and wherein the system further comprises a pressure controller to control the pressure of the control gas in the pressure chamber.

2. The system according to claim 1, wherein the movable member comprises a flexible wall member defining the actively tunable passage for reactor effluent, which wall member separates the actively tunable passage from a pressure chamber, the wall member being in contact with a control gas in said pressure chamber and being deformable by a pressure difference between the control gas within the pressure chamber and the pressure of the reactor effluent within the passage, and wherein the active pressure regulating arrangement further comprises a pressure controller to control the pressure of the control gas in the pressure chamber.

3. The system according to claim 2, wherein the flexible wall member is a deformable tube connecting the inlet and the outlet of the reactor effluent passage, which deformable tube is arranged to be closed when the pressure of the control gas is higher than the pressure of the reactor effluent.

4. The system according to claim 2, wherein the flexible wall member is a deformable membrane.

5. The system according to claim 2, wherein the flexible wall member comprises an elastomeric material.

6. The system according to claim 1, wherein the flow-through reactors each have a gas feed passage and/or a fluid feed passage connected to the reactor inlet with a flow control arrangement.

7. The system according to claim 1, wherein an analyzer device is connected to the outlet of the actively tunable passage of the reactors.

8. The system according to claim 7, wherein the analyzer device comprises a sample collection device.

9. The system according to claim 7, wherein the analyzer device comprises an on-line analytical apparatus connected via one or more selector valves to the outlets of the reactors via the outlets of the actively tunable passages.

10. Method for performing chemical experiments, wherein an array of parallel flow through reactors is used, one or more flows of reactant(s) being fed from one or more common feed lines to each of the reactors, the flow from each feed line being divided over the reactors by providing between each reactor and the feed line a flow restrictor, said flow restrictor producing a pressure drop ($\Delta P1$) between the feed line and the reactor, the pressure in the reactors being actively regulated by a backpressure regulator that is provided downstream of the reactors, which backpressure regulator controls the reactor pressure in multiple reactors whereby the reactor pressure is the same for all reactors, which backpressure regulator comprises downstream of each reactor, an individual active pressure regulating arrangement for actively regulating the reactor pressure, the pressure regulating arrangement comprising an actively tunable passage for reactor effluent with an inlet connected to the reactor outlet and an outlet for discharging reactor effluent at a reduced pressure with respect to the reactor pressure, wherein the active pressure regulating arrangement comprises an actively tunable passage arranged at the passage for reactor effluent of each reactor, wherein the actively tunable passage has a movable member to cause variations of the effective cross-section of the passage, and wherein the movable member is in contact with a common pressure chamber which is filled with a control gas, such that the movable member is moved towards the closed position if the reactor pressure is lower than the control gas pressure and is moved towards the open position if the reactor pressure exceeds the control gas pressure, and wherein the system further comprises a pressure controller to control the pressure of the control gas in the pressure chamber, which backpressure regulator has a passage for reactor effluent connected to the reactors, said passage having a discharge outlet for discharging reactor effluent, the backpressure regulator producing a pressure drop ($\Delta P2$) between each reactor and the discharge outlet which is greater than the pressure drop ($\Delta P1$) between the feed line and the reactor.

11. The method according to claim 10, wherein each of the flow-through reactors has a gas feed passage and/or a fluid feed passage connected to the reactor inlet with a flow control arrangement.

* * * * *

UNITED STATES PATENT AND TRADEMARK OFFICE
CERTIFICATE OF CORRECTION

PATENT NO. : 7,997,297 B2
APPLICATION NO. : 11/910493
DATED : August 16, 2011
INVENTOR(S) : Martin Smit et al.

It is certified that error appears in the above-identified patent and that said Letters Patent is hereby corrected as shown below:

In the Specification

At column 2, line 27, the printed patent incorrectly reads "...to the pressure con-roller.", and the patent should read --...to the pressure controller.--.

Signed and Sealed this
Fourth Day of June, 2013

Teresa Stanek Rea
*Acting Director of the United States Patent and Trademark Office*